United States Patent
Tseng

(10) Patent No.: US 7,740,784 B2
(45) Date of Patent: Jun. 22, 2010

(54) APPARATUS AND METHOD FOR IN-MOLD-DECORATION

(75) Inventor: Chung-Chi Tseng, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/329,621

(22) Filed: Dec. 7, 2008

(65) Prior Publication Data

US 2010/0007054 A1 Jan. 14, 2010

(30) Foreign Application Priority Data

Jul. 11, 2008 (CN) .................. 2008 1 0302707

(51) Int. Cl.
B29C 45/14 (2006.01)
B29C 45/16 (2006.01)
B29C 45/17 (2006.01)

(52) U.S. Cl. ............ 264/266; 264/511; 264/513; 425/112; 425/125; 425/126.1; 425/388

(58) Field of Classification Search ........... 425/112, 425/125, 126.1, 388; 264/511, 266, 294, 264/513

See application file for complete search history.

(56) References Cited

U.S. PATENT DOCUMENTS

| 3,363,040 A * | 1/1968 | Aoki ................... 264/278 |
| 4,601,366 A * | 7/1986 | Blain .................. 187/275 |
| 4,686,076 A * | 8/1987 | Dromigny et al. ....... 264/268 |
| 6,045,738 A * | 4/2000 | Atake .................. 264/266 |
| 6,743,389 B2 * | 6/2004 | Miyajima et al. ...... 264/272.17 |
| 2009/0108495 A1 * | 4/2009 | Takeuchi et al. ........ 264/266 |

FOREIGN PATENT DOCUMENTS

JP WO2007/004598 * 1/2007

\* cited by examiner

Primary Examiner—Joseph S Del Sole
Assistant Examiner—Robert Dye
(74) Attorney, Agent, or Firm—Zhigang Ma

(57) ABSTRACT

An apparatus for in-mold-decoration includes a male mold, a female mold comprising a surface facing the male mold, a foil, a press member, and a supporting member. The surface of the female mold defines a cavity. The foil is applied to the surface of the female mold. The press member is positioned between the male mold and the female mold, and capable of hermetically pressing the foil on the surface of the female mold. The supporting member is movably mounted to the surface of the female mold to prop up the foil toward the male mold before the press member presses the foil on the surface of the female mold.

12 Claims, 8 Drawing Sheets

APPARATUS AND METHOD FOR IN-MOLD-DECORATION

BACKGROUND

1. Technical Field

The present invention generally relates to molding apparatuses and methods and, particularly, to an apparatus and a related method for in-mold-decoration.

2. Description of Related Art

A common apparatus for In-Mold-Decoration is illustrated in FIGS. 1 and 2. The apparatus includes a foil 100, a male mold 20, a female mold 30 defining a cavity 31 therein, and a plurality of press blocks 40. The male mold 20 and the female mold 30 cooperate to define a molding space therebetween. The foil 100 among the press blocks 40, has an L length, and is extended in the molding space to spread on a surface of the cavity.

However, when the cavity 31 is greatly recessed, the foil 100 may be elongated to rupture because the elongate-limit of the foil 100.

What is needed is to provide a method and an apparatus to overcome the above-mentioned shortcomings.

DETAILED DESCRIPTION

Figure 1:
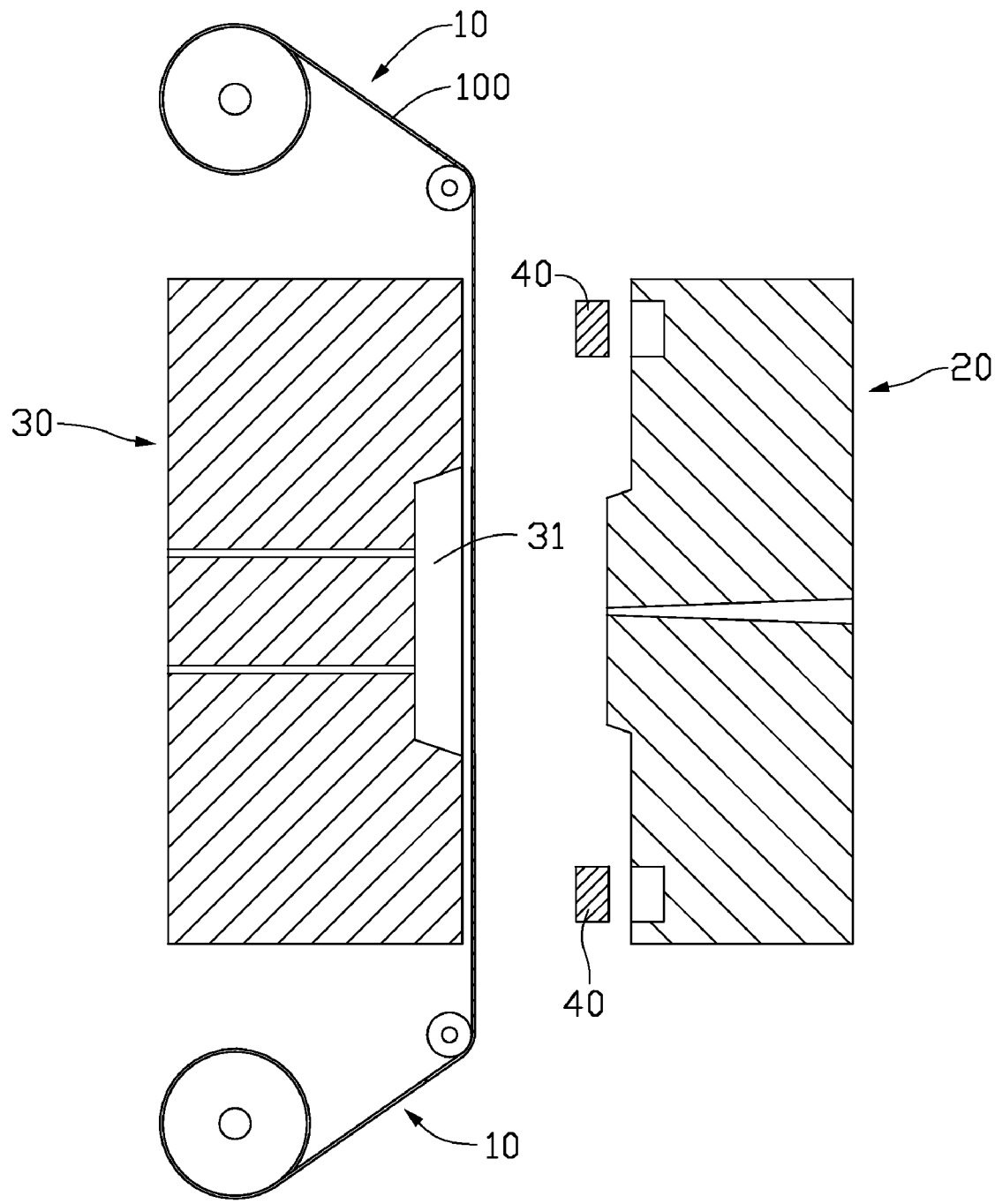
FIG. 1 is a cross-sectional view of an apparatus for in-mold-decoration in the related art, the apparatus including a foil, and a female mold.
Figure 2:
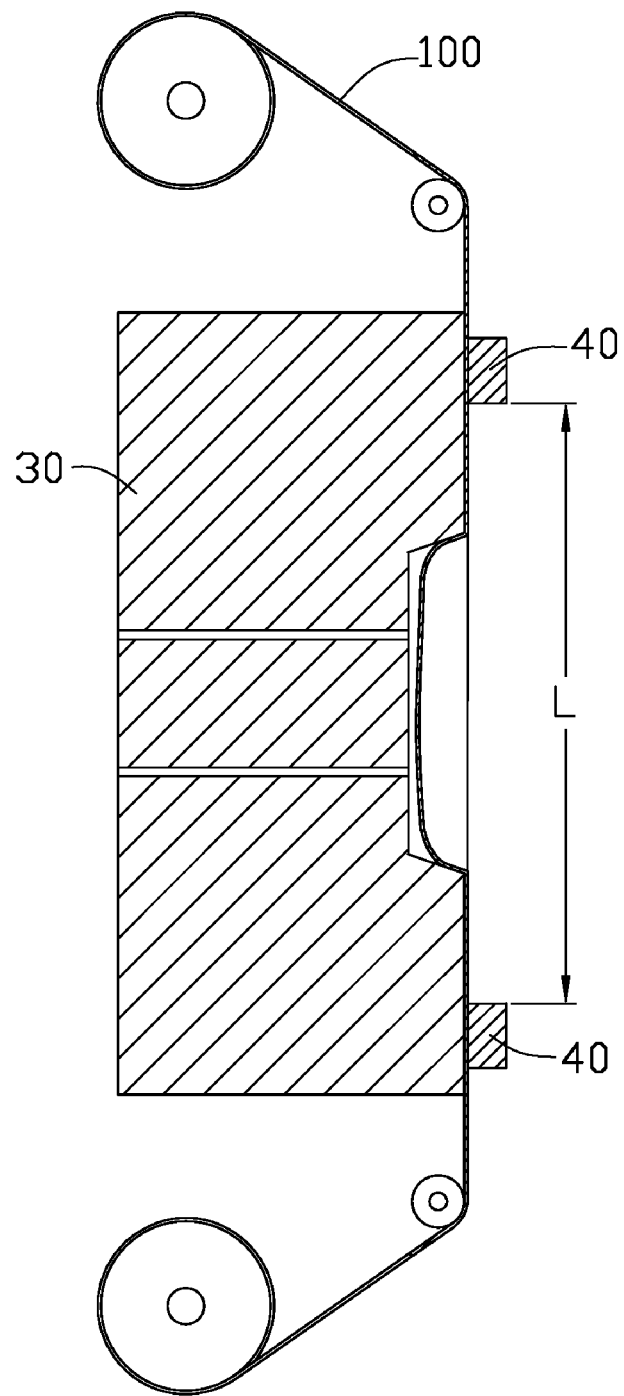
FIG. 2 is a cross-sectional view of the female mold and the foil of FIG. 1, showing the foil being elongated.
Figure 3:
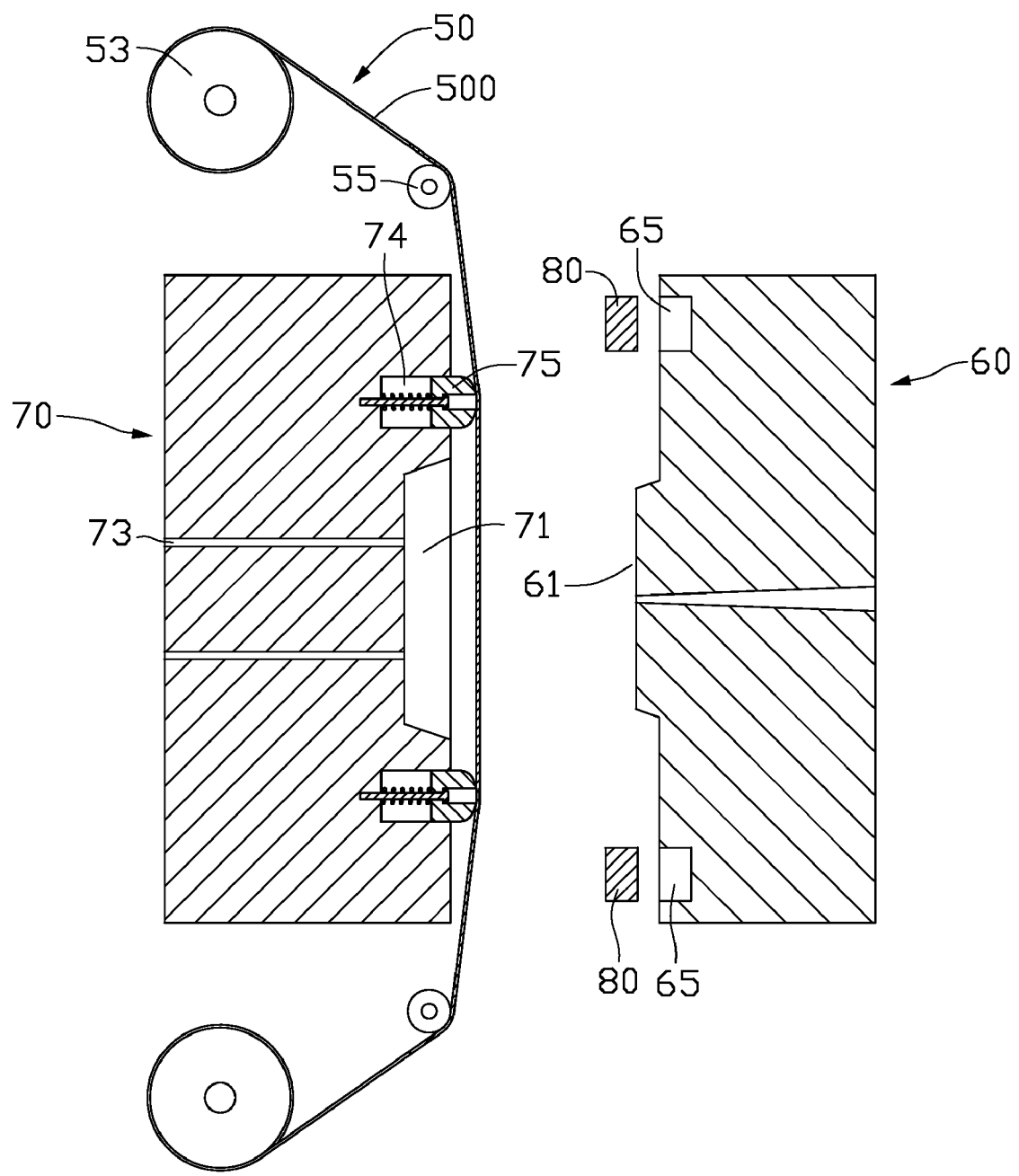
FIG. 3 is a cross-sectional view of a first exemplary embodiment of an apparatus for in-mold-decoration, the apparatus including a female mold and a foil.

Referring to FIG. 3, an exemplary embodiment of an apparatus for in-mold-decoration includes a foil 500, a transport 50, a male mold 60, a female mold 70, and a plurality of press members 80.

The transport 50 includes two transporting rollers 53 and two guiding rollers 55 positioned at opposite ends of the apparatus respectively, for transporting the foil 500 into the male and female molds 60 and 70.

The male mold 60 includes a first side facing the female mold 70, the first side forms a projecting part 61 protruding toward the female mold 70. A plurality of receiving slots 65 are defined in the first side of the male mold 60 in vicinity of edges of the male mold 60 for receiving the corresponding press members 80.

Figure 4:
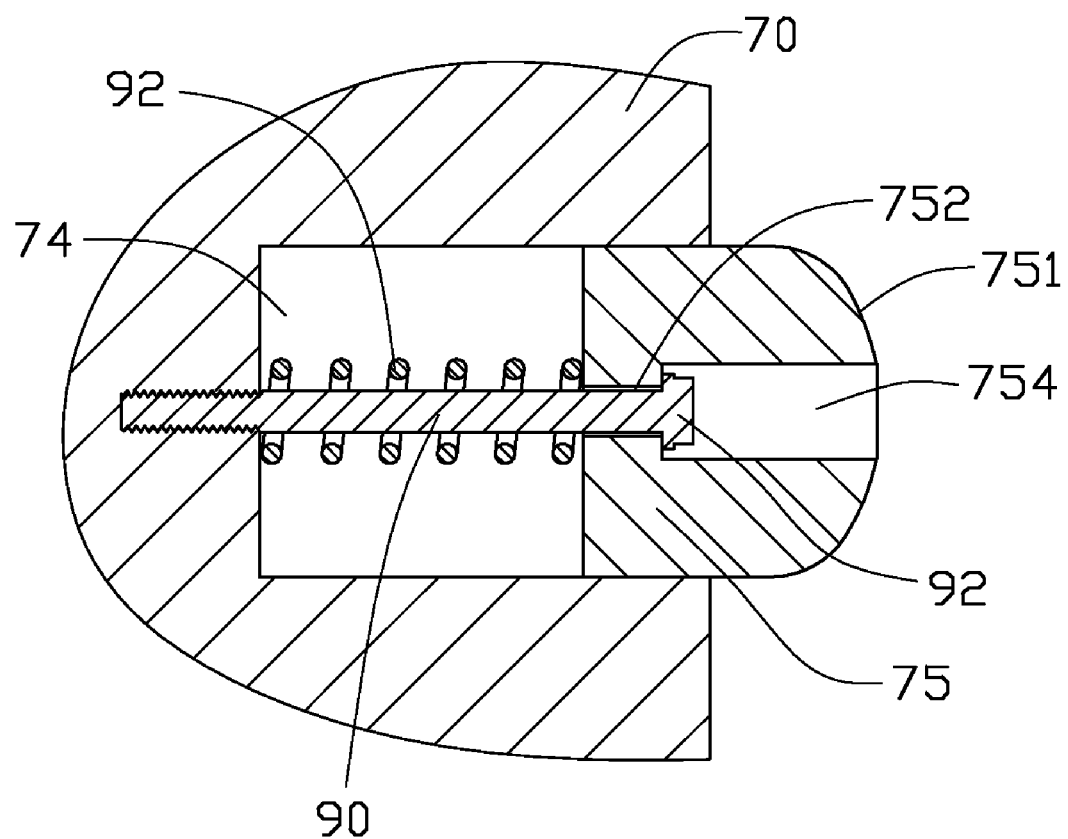
FIG. 4 is an enlarged, partial cross-sectional view of the apparatus of FIG. 3.

Referring also to FIG. 4, the female mold 70 includes a first side facing the male mold 60 and a second side opposite to the first side of the female mold 70. The first side of the female mold 70 defines a cavity 71 that includes a bottom surface. A plurality of air discharging holes 73 are defined in the female mold 70 and extending from the first side to the second side of the female mold 70. At least two of the air discharging holes 73 extend from the bottom surface of the cavity 71 to the second side of the female mold 70. Each air discharging hole 73 is connected to a vacuum pump (not shown) at the second side of the female mold 70. At least two recessed portions 74 are formed on the first side of the female mold 70 adjacent to the cavity 71. A supporting member 75 is mounted in each recessed portion 74, including an arc-shaped head 751 to avoid damaging the foil 500. A T-shaped through hole is defined in the supporting member 75 along the axial direction. The through hole includes a smaller hole 752 away from the head 751 of the supporting member 75, and a bigger hole 754 communicating with the small hole 752 and extending through the arc-shaped head 751 of the supporting member 75. A mounting member 90 including a head 92 extends through the through hole to screw into a bottom of the recessed portion 74, with the head 92 received in the bigger hole 754 to avoid interfering with the first side of the male mold 60. In one embodiment, the mounting member 90 is a bolt. A resilient member 92 is arranged between the supporting member 75 and the bottom of the recessed portion 74, and fits about the mounting member 90. In one embodiment, the resilient member 92 is a coil spring.

Figure 6:
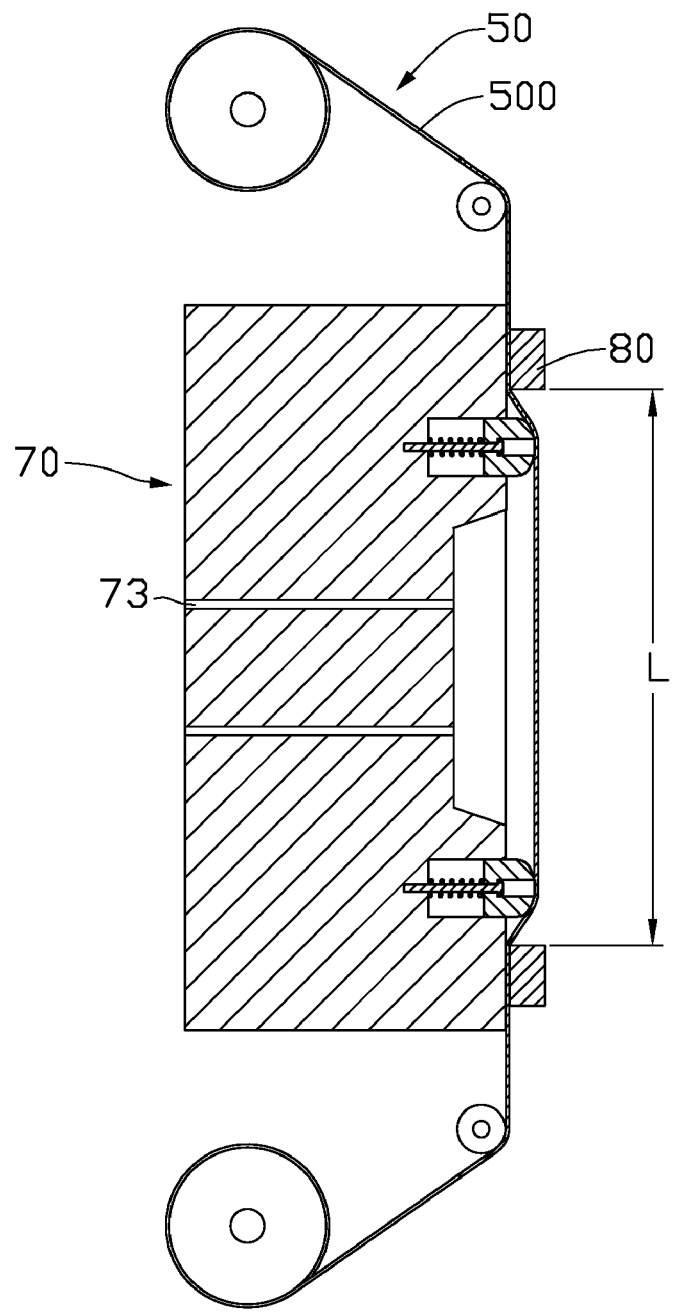
FIG. 6 is a cross-sectional view of the female mold and the foil of the apparatus of FIG. 3, but showing the foil being pressed on the female mold.
Figure 7:
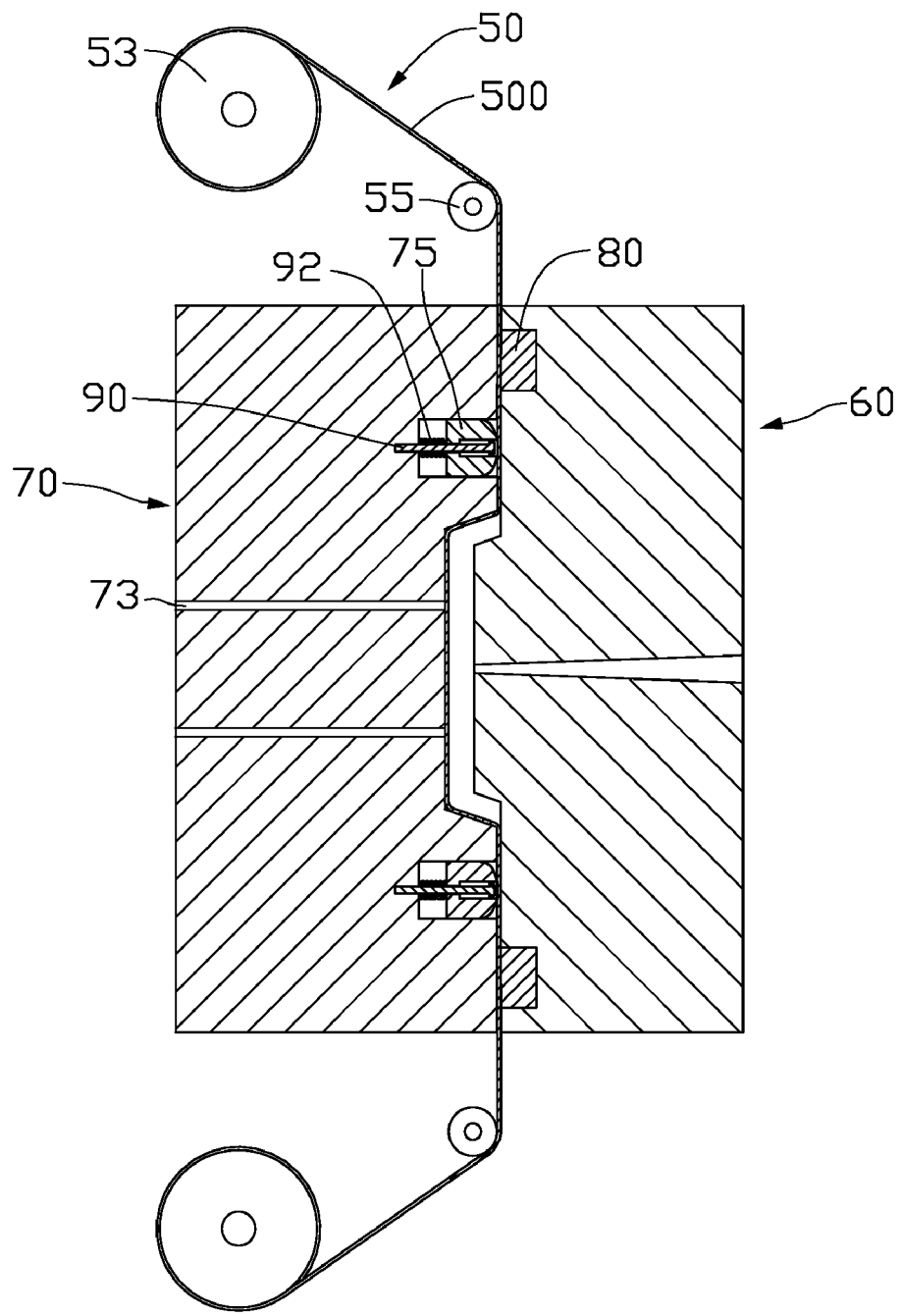
FIG. 7 is similar to FIG. 3, but showing an injection state of the apparatus.

Referring to FIGS. 6 and 7, in use, the foil 500 is transported between the male and female molds 60 and 70 via the transport 50. The supporting members 75 are out of the first side of the female mold 70 biased by the resilient member 92 to prop up the foil 500 toward the male mold 60. When the male mold 60 and the female mold 70 are closed, the projecting part 61 enters into the cavity 71, the press member 80 hermetically presses the foil 500 on the first side of the female mold 70. Each supporting member 75 is located between the cavity 71 and the corresponding press member 80. The first side of the male mold 60 drives the supporting members 75 to retract into the corresponding recessed portions 74, until the arc-shaped end of the supporting members 75 are coplanar with the first side of the female mold 70.

Figure 5:
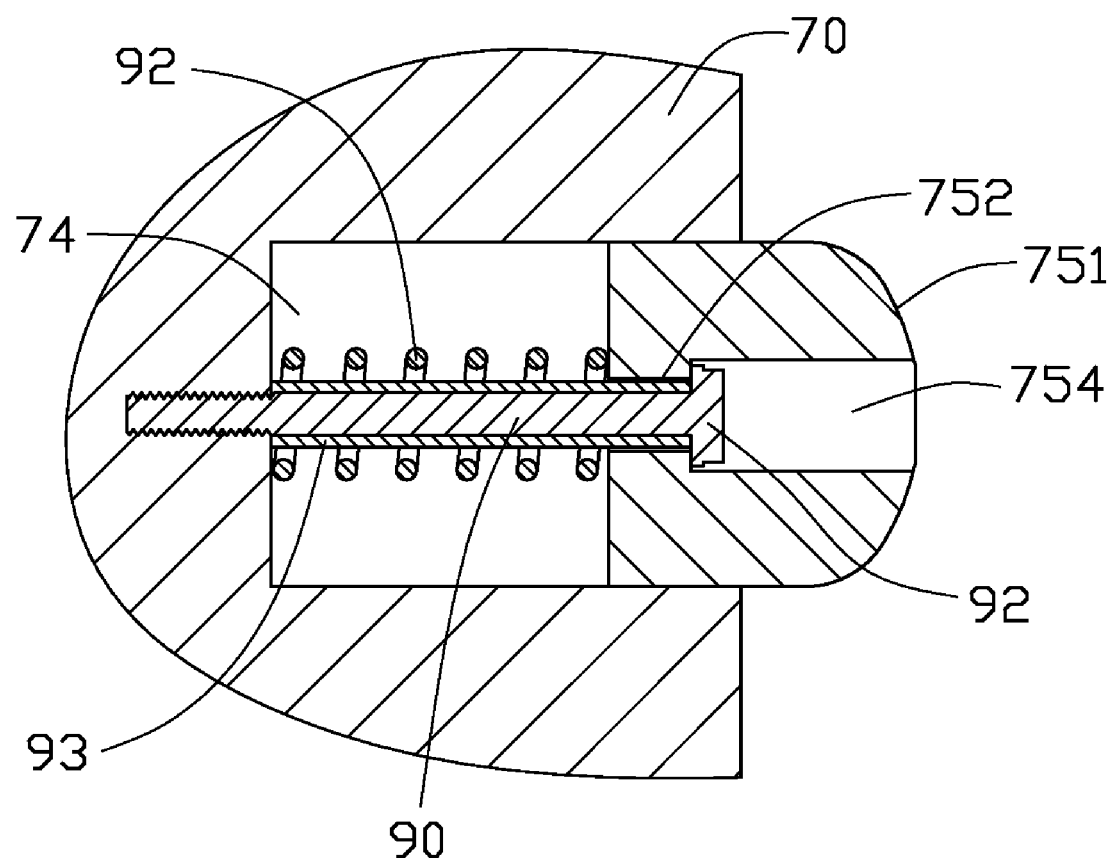
FIG. 5 is similar to FIG. 4, but showing a second exemplary embodiment.

Referring to FIG. 5, in a second exemplary embodiment, a sleeve 93 fitting about each mounting member 90. The sleeve 93 is located between the head 92 of the mounting member 90 and the bottom of a corresponding recessed portion 74. The sleeve 93 is used for adjusting a length of the supporting member 75 out of the first side of the female mold 70.

Figure 8:
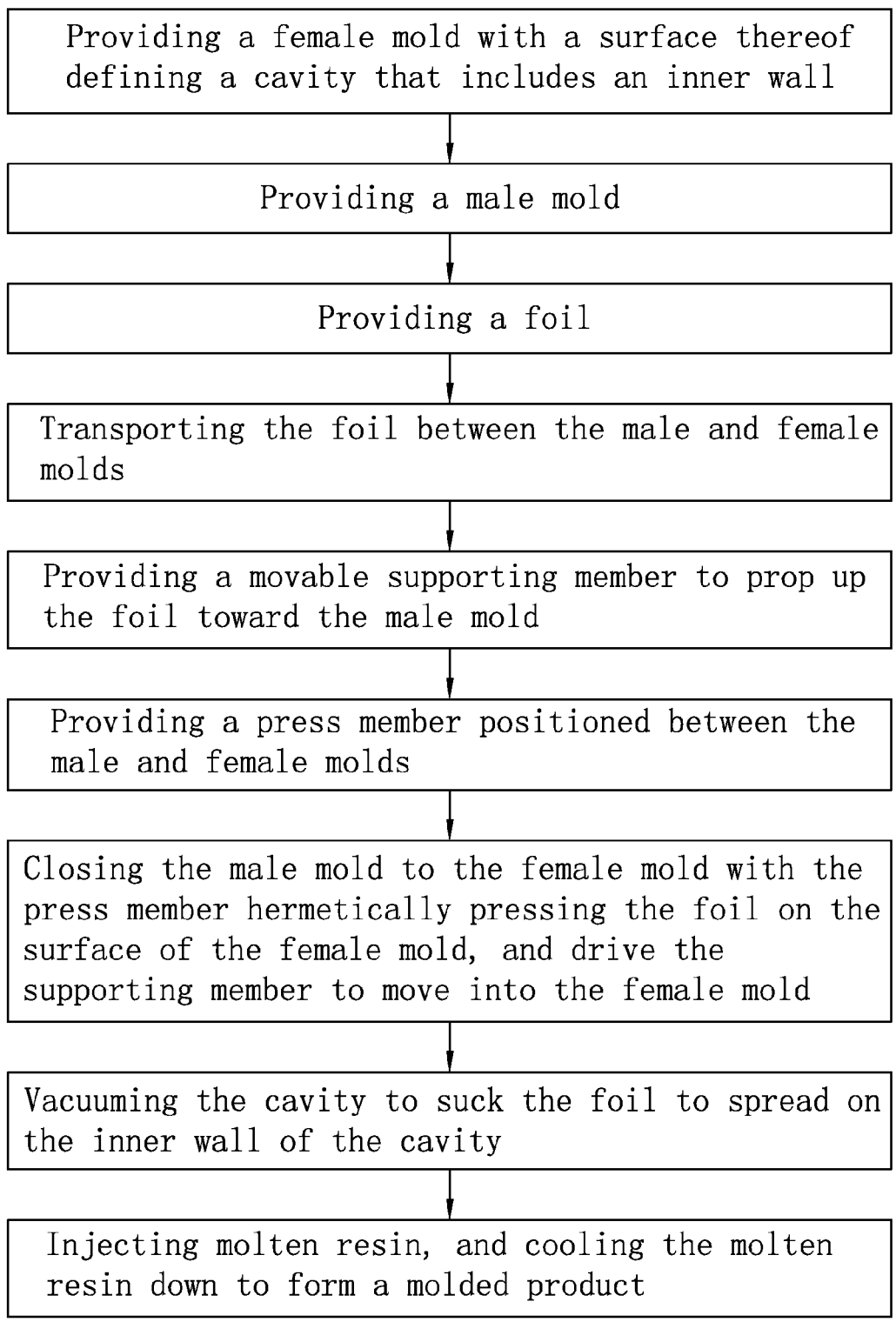
FIG. 8 is a flowchart of an exemplary embodiment of a method for in-mold-decoration.

Referring to FIG. 8, an exemplary embodiment of a method for in-mold-decoration includes the following steps:

providing a female mold with a surface thereof defining a cavity that includes an inner wall;

providing a male mold;

providing a foil;

transporting the foil between the male and female molds;

providing a movable supporting member to prop up the foil toward the male mold;

providing a press member positioned between the male and female molds;

closing the male mold to the female mold with the press member hermetically pressing the foil on the surface of the female mold, and driving the supporting member to move into the female mold;

vacuuming the cavity to suck the foil to spread on the inner wall of the cavity; and injecting molten resin, and cooling the molten resin down to form a molded product.

In one embodiment, the apparatus is used for effectively clinging the foil 500 to the cavity 71 of the female mold 70 by increasing the length of the foil 500 between the press members 80 via the supporting members 75. For example, if the distance between the press members 80 is L, the length of the foil 500 between the press members 80 will be greater than L because the supporting members 75 prop up the foil 500. Thus, chances for the foil 500 to be broken or stretched could be reduced.

In another embodiment, the length of the foil 500 between the press members is capable of being adjusted by changing lengths of the supporting members 75 extending out of the first side of the female mold 70.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An apparatus for in-mold-decoration using a foil, comprising:
    a male mold;
    a female mold comprising a surface facing the male mold, wherein the surface defines a cavity therein, and the foils is applied to the surface of the female mold;
    a press member positioned between the male mold and the female mold, capable of hermetically pressing the foil on the surface of the female mold; and
    a supporting member movably mounted to the surface of the female mold to prop up the foil toward the male mold before the press member presses the foil on the surface of the female mold, the supporting member being capable of moving substantially perpendicularly to the surface of the female mold;
    wherein the supporting member is mounted to the female mold between the cavity and the press member.

2. The apparatus of claim 1, wherein the surface of the female mold defines a recessed portion for receiving the supporting member.

3. The apparatus of claim 2, wherein the supporting member defines a through hole, a mounting member is provided to extend through the through hole of the supporting member to screw the supporting member to a bottom of the recessed portion.

4. The apparatus of claim 3, wherein a resilient member is arranged between the supporting member and the bottom of the recessed portion, to bias the supporting member to prop up the foil.

5. The apparatus of claim 4, wherein the resilient member is a coil spring.

6. The apparatus of claim 3, wherein the mounting member comprises a head, the through hole is T-shaped and comprises a smaller hole for the mounting member extending therethrough, and a bigger hole communicating with the small hole for receiving the head of the mounting member, to avoid the head interfering with the male mold.

7. The apparatus of claim 6, wherein the mounting member is a bolt.

8. The apparatus of claim 6, further comprising a sleeve member received in the through hole of the supporting member and fitting about the mounting member, the sleeve is located between the head of the mounting member and the bottom of the recessed portion.

9. The apparatus of claim 1, wherein the supporting member comprises an arc-shaped head facing the male mold, to avoid damaging the foil.

10. The apparatus of claim 1, wherein a surface of the cavity defines at least one air discharging holes.

11. A method for in-mold-decoration comprising:
    providing a female mold with a surface thereof defining a cavity that includes an inner wall;
    providing a male mold;
    providing a foil;
    transporting the foil between the male and female molds;
    providing a movable supporting member to prop up the foil toward the male mold;
    providing a press member positioned between the male and female molds;
    closing the male mold to the female mold with the press member hermetically pressing the foil on the surface of the female mold, and driving the supporting member to move into the female mold;
    vacuuming the cavity to suck the foil to spread on the inner surface of the cavity; and
    injecting molten resin, and cooling the molten resin down to form a molded product.

12. The method of claim 11, wherein the supporting member is mounted to the female mold between the cavity and the press member.

* * * * *